US010299243B2

(12) United States Patent
Sen et al.

(10) Patent No.: US 10,299,243 B2
(45) Date of Patent: May 21, 2019

(54) MOBILITY DETERMINATION

(71) Applicant: Hewlett Packard Enterprise Development LP, Houston, TX (US)

(72) Inventors: Souvik Sen, Mountain View, CA (US); Li Sun, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 6 days.

(21) Appl. No.: 15/319,029

(22) PCT Filed: Jul. 30, 2014

(86) PCT No.: PCT/US2014/048900
§ 371 (c)(1),
(2) Date: Dec. 15, 2016

(87) PCT Pub. No.: WO2016/018309
PCT Pub. Date: Feb. 4, 2016

(65) Prior Publication Data
US 2017/0127377 A1  May 4, 2017

(51) Int. Cl.
*H04W 4/00* (2018.01)
*H04W 64/00* (2009.01)
*H04B 7/06* (2006.01)
*H04W 84/12* (2009.01)
*H04B 7/0452* (2017.01)
*H04W 88/08* (2009.01)

(52) U.S. Cl.
CPC ........ *H04W 64/006* (2013.01); *H04B 7/0626* (2013.01); *H04B 7/0452* (2013.01); *H04W 84/12* (2013.01); *H04W 88/08* (2013.01)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS

| 7,385,934 B2 | 6/2008 | Uehara et al. |
| 7,541,976 B2 | 6/2009 | Yang et al. |
| 8,559,887 B2 | 10/2013 | Stager et al. |

(Continued)

FOREIGN PATENT DOCUMENTS

| CN | 101557625 B | 4/2011 |
| WO | WO-2007081650 A2 | 7/2007 |

(Continued)

OTHER PUBLICATIONS

"3rd Generation Partnership Project; 6,7 Technical Specification Group Radio Access Network; Evolved Universal Terrestrial Radio Access Network (E-UTRAN); Stage 2 functional specification of User Equipment (UE) positioning in E-UTRAN (Release 12)". 3GPP Standard; 3GPP TS 36.305, 3rd Generation Partnership Project (3GPP), Mobile Competence Centre • 650, Route Des Lucioles ; F-06921 Sophia-Antipolis Cedex ; France, vol. RAN WG2, No. V12.1.0, Jul. 1, 2014. pp. 1-59, XP050774518.

(Continued)

*Primary Examiner* — Siren Wei
(74) *Attorney, Agent, or Firm* — Mannava & Kang, P.C.

(57) ABSTRACT

According to an example, mobility may be determined between a mobile device and a wireless access point (AP).

13 Claims, 7 Drawing Sheets

(56) References Cited

U.S. PATENT DOCUMENTS

| | | | |
|---|---|---|---|
| 2003/0119525 A1* | 6/2003 | Rajkotia | G01S 5/14 455/456.1 |
| 2008/0248741 A1* | 10/2008 | Alizadeh-Shabdiz | G01S 5/0294 455/3.02 |
| 2010/0215034 A1* | 8/2010 | Klein | H04W 36/06 370/352 |
| 2011/0176634 A1* | 7/2011 | Yoon | H04L 5/0023 375/295 |
| 2011/0298579 A1 | 12/2011 | Hardegger et al. | |
| 2014/0200009 A1 | 7/2014 | Schier et al. | |
| 2014/0204793 A1 | 7/2014 | Ben-Haim et al. | |
| 2015/0326340 A1* | 11/2015 | Huang | H04B 7/0413 375/267 |

FOREIGN PATENT DOCUMENTS

| | | |
|---|---|---|
| WO | WO-2014032908 | 3/2014 |
| WO | WO-2014060777 | 4/2014 |

OTHER PUBLICATIONS

3rd Generation Partnership Project; 9 Technical Specification Group Radio Access Network; Evolved Universal Terrestrial Radio Access (E-UTRA); Physical Channels and Modulation (Release 10), 3GPP Standard; 3GPP TS 36.211, 3rd Generation Partnership Project (3GPP), Mobile Competence Centre, 650, Route Des Lucioles; F-06921 Sophia-Antipolis Cedex; France, vol. RAN WG1, No. V10.2.0, Jun. 22, 2011. pp. 1-103, XP050553380.

Anonymous: "3rd Generation Partnership Project; Technical Specification Group Radio Access Network; Evolved Universal Terrestrial Radio Access (E-UTRA); Physical layer procedures TS 36.213 (Release 12)", 1-15, Dec. 20, 2013, pp. 1-186, XP055354486, Retrieved from the Internet: URL:www.3gpp.org/ftpjspecsjarchive/36 seri es/36.213.

Yang, Z et al, "From RSSI to CSI: Indoor Localization via Channel Response", Jun. 2014.

Ravindranath et al., "Improving wireless network performance using sensor hints", In USENIX NSDI 2011, 14 pages.

International Search Report and Written Opinion received for PCT Patent Application No. PCT/US2014/048900, dated May 26, 2015, 10 pages.

International Preliminary Report on Patentability received for PCT Patent Application No. PCT/US2014/048900, dated Feb. 9, 2017, 8 pages.

European Search Report and Search Opinion Received for EP Application No. 14898494.1, dated Jan. 25, 2018, 11 pages.

* cited by examiner

500

DETERMINE CHANNEL STATE INFORMATION (CSI) FOR A WIRELESS CHANNEL BETWEEN A MOBILE DEVICE AND A WIRELESS ACCESS POINT (AP)
502

USE THE CSI TO DETERMINE MOVEMENT BETWEEN THE MOBILE DEVICE AND THE WIRELESS AP
504

MOBILITY DETERMINATION

BACKGROUND

Mobile devices typically use a wireless access point (AP) to connect to a wired network using Wi-Fi, cellular, or other wireless communication techniques. Examples of such mobile devices include smartphones, tablets, and laptops. Movement between the mobile device and the wireless AP is typically determined by various sensors in the mobile device. Examples of such sensors include Global Positioning System (GPS) sensors, accelerometers, and gyroscopes. The movement between the mobile device and the wireless AP is typically used to determine parameters of a wireless local area network (WLAN) protocol that is used for communication between the mobile device and the wireless AP. For example, during movement between the mobile device and the wireless AP, the mobile device is typically roamed to another wireless AP that is in closer proximity of the mobile device for improving the wireless channel quality between the mobile device and a wireless AP.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
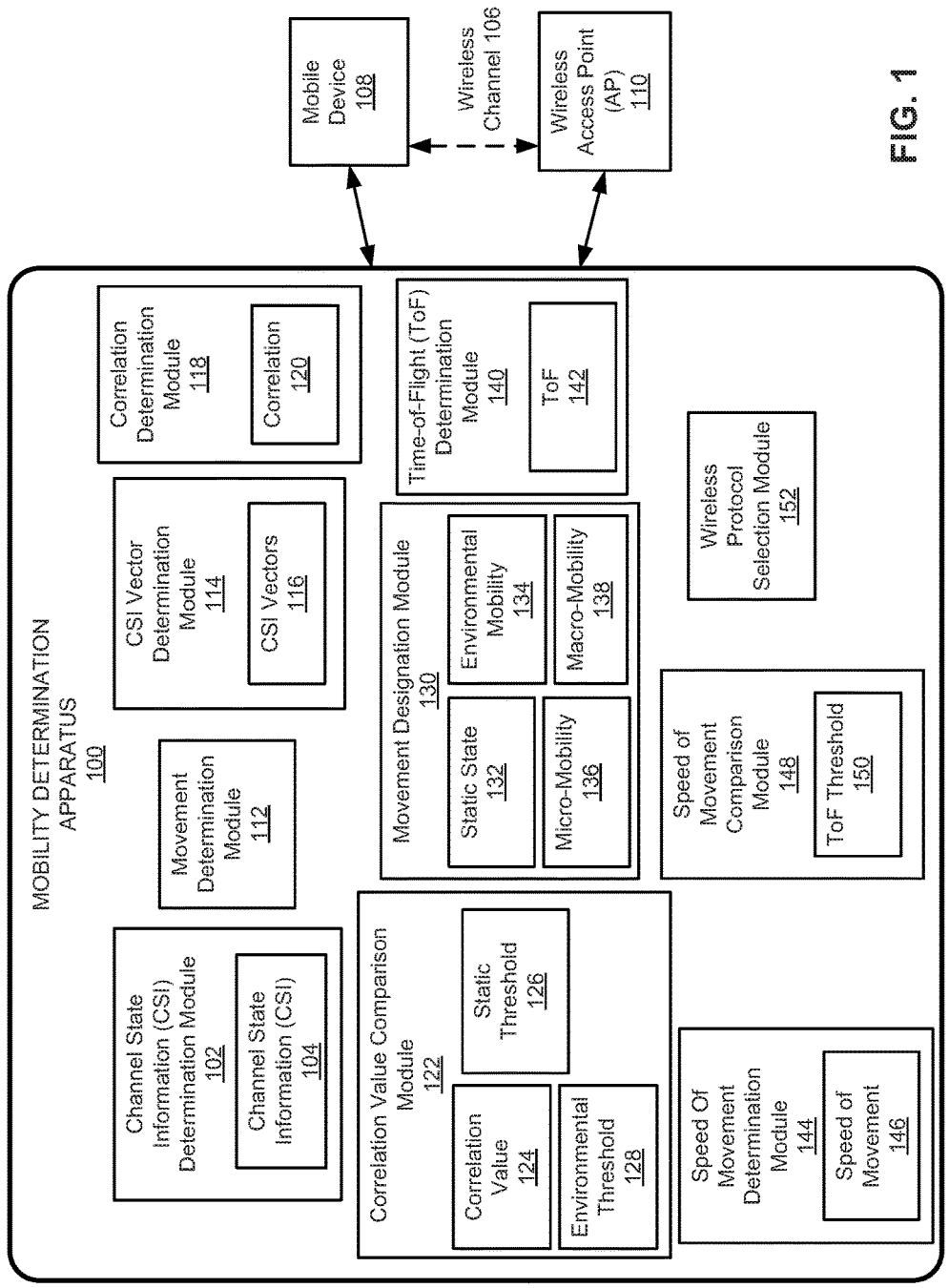
FIG. 1 illustrates an architecture of a mobility determination apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

The movement between a mobile device and a wireless AP is typically used to determine parameters of a WLAN protocol that is used for communication between the mobile device and the wireless AP. For example, movement between the mobile device and the wireless AP may result in variations in the quality of the wireless channel between the mobile device and the wireless AP, data transmission loss, and the need to load balance due to roaming of the mobile device. Thus, depending on whether the mobile device is moving or static relative to the wireless AP, different wireless networking protocols may be used for communication between the mobile device and the wireless AP. For example, in static scenarios, historical information may be leveraged to select appropriate protocols for communication between the mobile device and the wireless AP. However, in mobile scenarios, some of the historical information may not be useful, and different protocols may be used to avoid transmission loss. Moreover, the mobility state of a mobile device may be classified in a variety of mobility states to thus provide for selection of an appropriate wireless networking protocol for communication between the mobile device and the wireless AP. For example, the mobile device and/or the wireless AP may be classified as either in a static state, under environmental mobility, undergoing micro-mobility, or undergoing macro-mobility.

The static state may represent a state in which there is no movement between the mobile device and the wireless AP that affects a wireless channel between the mobile device and the wireless AP. An example of a static state may include a user that is working on a laptop in a home environment.

The environmental mobility may include movement of an object and/or a person that is external to the mobile device and/or the wireless AP that affects the wireless channel between the mobile device and the wireless AP. Under environmental mobility, the mobile device (and the wireless AP) may be considered to be static, but external movement may affect the wireless channel between the mobile device and the wireless AP. An example of environmental mobility may include an airport terminal in which movement of an object (e.g., various machines and luggage) and/or a person that is external to the mobile device and/or the wireless AP affects a wireless channel between the mobile device and the wireless AP.

Micro-mobility may include a relatively smaller amount of movement or constrained movement between the mobile device and the wireless AP compared to the macro-mobility. Generally, micro-mobility and macro-mobility may include movement of the mobile device and/or the wireless AP that affects the wireless channel between the mobile device and the wireless AP.

Under micro-mobility, the mobile device may be considered to be moving without extensive change in the location of the mobile device. For example, when a user that is sitting uses a smartphone to make a call, the smartphone may include limited movement. The limited movement may nevertheless be sufficient to affect (i.e., change) the wireless channel between the mobile device and the wireless AP.

Under macro-mobility, the mobile device may be considered to be moving with extensive change in the location of the mobile device. For example, when a user that is walking uses a smartphone to make a call, the smartphone may include relatively extensive movement. The relatively extensive movement will likely affect (i.e., change) the wireless channel between the mobile device and the wireless AP.

According to an example, a mobility determination apparatus and a method for mobility determination are disclosed herein. The apparatus and method disclosed herein may determine a mobility state of a mobile device relative to a wireless AP, and classify the mobility state as a static state, environmental mobility, micro-mobility, or macro-mobility.

The apparatus and method disclosed herein may generally determine movement of a mobile device relative to a wireless AP using physical (PHY) layer information available from a wireless AP. For example, the apparatus and method disclosed herein may utilize information available from the wireless AP firmware, without the need for modification of software (i.e., machine readable instructions) on the mobile device. According to an example, the apparatus and method disclosed herein may utilize Channel State Information (CSI) to determine whether the mobile device is in a static state or in a mobile state (e.g., under environmental mobility, or under micro-mobility or macro-mobility). The apparatus and method disclosed herein may utilize time-of-flight (ToF) measurements to discriminate between the micro-mobility and the macro-mobility.

With respect to CSI, CSI is a direct measurement of the wireless channel between the wireless AP and the mobile device. As disclosed herein, the CSI may represent PHY layer information that reports channel metrics for a wireless channel between the mobile device and the wireless AP in the frequency domain. The CSI may capture the delay and attenuation of different signal paths traversing from the mobile device to the wireless AP.

As disclosed herein, the ToF may capture a propagation delay between a transmitter at the mobile device or the wireless AP, and a receiver at the other one of the wireless AP or the mobile device.

According to an example, the mobility determination apparatus may include a processor, and a memory storing machine readable instructions that when executed by the processor cause the processor to use CSI to determine movement between a mobile device and a wireless AP. The wireless AP may include, for example, a WiFi or a cellular based AP. In response to a determination that the mobile device is moving relative to the wireless AP, the machine readable instructions may further cause the processor to use ToF for a signal traversal between the mobile device and the wireless AP to determine a speed of the movement of the mobile device relative to the wireless AP.

FIG. 1 illustrates an architecture of a mobility determination apparatus 100 (hereinafter also referred to as "apparatus 100"), according to an example of the present disclosure. Referring to FIG. 1, the apparatus 100 is depicted as including a channel state information (CSI) determination module 102 to determine CSI 104 for a wireless channel 106 between a mobile device 108 and a wireless AP 110.

A movement determination module 112 is to use the CSI 104 to determine movement between the mobile device 108 and the wireless AP 110.

A CSI vector determination module 114 is to determine a plurality of CSI vectors 116 that represent the CSI 104 at different times.

A correlation determination module 118 is to determine correlation 120 within a pair of the plurality of CSI vectors 116 to determine the movement between the mobile device 108 and the wireless AP 110.

A correlation value comparison module 122 is to compare a correlation value 124 (i.e., a CSI correlation value 124) that is determined by the correlation 120 to a static threshold 126 and to an environmental threshold 128.

A movement designation module 130 is to determine whether the mobile device 108 is static (i.e., in a static state 132) relative to the wireless AP 110, whether there is environmental mobility 134 between the mobile device 108 and the wireless AP 110, and whether there is micro-mobility 136 or macro-mobility 138 between the mobile device 108 and the wireless AP 110. According to an example, the environmental mobility 134 may include movement of an object and/or a person that is external to the mobile device 108 and/or the wireless AP 110 that affects the wireless channel 106 between the mobile device 108 and the wireless AP 110. The micro-mobility 136 may include a relatively smaller amount of movement or constrained movement between the mobile device 108 and the wireless AP 110 compared to the macro-mobility 138. Further, the micro-mobility 136 and the macro-mobility 138 may include movement of the mobile device 108 and/or the wireless AP 110 that affects the wireless channel 106 between the mobile device 108 and the wireless AP 110.

With respect to the static state 132, in response to a determination that the correlation value 124 is greater than the static threshold 126, the movement designation module 130 may designate the mobile device 108 as being in the static state 132 relative to the wireless AP 110.

With respect to the environmental mobility 134, in response to a determination that the correlation value 124 is less than the static threshold 126 and greater than the environmental threshold 128, the movement designation module 130 may designate the mobile device 108 as being under environmental mobility 134 relative to the wireless AP 110.

With respect to the micro-mobility 136 and the macro-mobility 138, in response to a determination that the correlation value 124 is less than the environmental threshold 128, the movement designation module 130 may designate the mobile device 108 as being under micro-mobility 136 or macro-mobility 138 relative to the wireless AP 110.

A time-of-flight (ToF) determination module 140 is to determine a ToF 142 for a signal traversal between the mobile device 108 and the wireless AP 110.

A speed of movement determination module 144 is to use the ToF 142 for the signal traversal between the mobile device 108 and the wireless AP 110 to determine a speed of movement 146 of the mobile device 108 relative to the wireless AP 110. Generally, the speed of movement determination module 144 may use the ToF 142 for the signal traversal between the mobile device 108 and the wireless AP 110 to distinguish between the micro-mobility 136 and the macro-mobility 138.

A speed of movement comparison module 148 is to compare the speed of movement 146 of the mobile device 108 relative to the wireless AP 110 to a ToF threshold 150. With respect to the micro-mobility 136, in response to a determination that the speed of movement 146 of the mobile device 108 relative to the wireless AP 110 is less than the ToF threshold 150, the movement designation module 130 may designate the movement between the mobile device 108 and the wireless AP 110 as the micro-mobility 136. With respect to the macro-mobility 138, in response to a determination that the speed of movement 146 of the mobile device 108 relative to the wireless AP 110 is greater than the ToF threshold 150, the movement designation module 130 may designate the movement between the mobile device 108 and the wireless AP 110 as the macro-mobility 138.

A wireless protocol selection module 152 is to select an appropriate wireless protocol for the wireless channel 106 based on whether the mobile device 108 is in the static state 132 relative to the wireless AP 110, whether there is environmental mobility 134 between the mobile device 108 and the wireless AP 110, and whether there is micro-mobility 136 or macro-mobility 138 between the mobile device 108 and the wireless AP 110.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

With respect to the CSI 104, the CSI 104 may represent PHY layer information that reports channel metrics for the wireless channel 106 in the frequency domain. The CSI 104 may capture the delay and attenuation of different signal paths traversing from the mobile device 108 to the wireless AP 110. If the mobile device 108 transmits a symbol X, the quality of the received symbol at the wireless AP 110, Y, depends on the CSI H as follows:

$$Y=H*X+n \quad \text{Equation (1)}$$

For Equation (1), H may represent the channel matrix for the wireless channel 106, and n may represent a noise vector. The CSI 104 may be represented as a vector which includes complex numbers representing the channel gain for every subcarrier (i.e., sub-channel) and for every transmit-receive antenna pair. For example, assuming the wireless AP 110 includes 52 subcarriers (i.e., m subcarriers) and 3 antennas (i.e., p antennas), in this example, the CSI 104 may be represented as a complex vector of size 52×3 (i.e., m×p). Thus, the CSI 104 may be determined as a function of a number of subcarriers and antennas supported by the wireless AP 110.

As described herein, the correlation determination module 118 may determine the correlation 120 within a pair of the plurality of CSI vectors 116 to determine the movement between the mobile device 108 and the wireless AP 110. Generally, CSI correlation 120 may be used to capture how the CSI 104 changes over time. Since the CSI 104 is a direct measure of the wireless channel 106 between the wireless AP 110 and the mobile device 108, if the wireless channel 106 changes relatively quickly, the correlation of the current CSI and a past CSI will be low. If the wireless channel 106 remains stable because the mobile device 108 is in a static mode, the correlation value will be relatively high. The correlation (Corr (i, j)) between two CSI vectors $CSI^i$ and $CSI^j$ may be determined as follows:

$$\text{Corr}(i,j) = \frac{\sum_{x=1}^{m}(CSI_x^i - \overline{CSI^i})(CSI_x^j - \overline{CSI^j})}{\sqrt{\sum_{x=1}^{m}(CSI_x^i - \overline{CSI^i})^2 \sum_{x=1}^{m}(CSI_x^j - \overline{CSI^j})^2}} \quad \text{Equation (2)}$$

For Equation (2), $CSI^i$ may represent a CSI sample determined at time $t_i$ on one antenna (e.g., the first antenna p). Assuming there are in numbers (e.g., 52 numbers) in $CSI^i$, each number in $CSI^i$ is a real number representing the magnitude value on its corresponding subcarrier. In Equation (2), $CSI_x^i$ may represent one number out of m in $CSI^i$ with index x, and $\overline{CSI^i}$ may represent the average value of all m numbers in $CSI^i$. Similarly, $CSI^j$ may represent a CSI sample determined at time j on one antenna (e.g., the first antenna), where j is a time value in milliseconds. In Equation (2), $CSI_x^j$ may represent one number out of m in $CSI^j$ with index x, and $\overline{CSI^j}$ may represent the average values of all m numbers in $CSI_x^j$. Equation (2) may be used to determine the CSI correlation value (i.e., a CSI correlation coefficient) of $CSI^i$ and $CSI^j$ on the first antenna of the p antennas (i.e., to determine one correlation value). Similarly, Equation (2) may be used to determine the CSI correlation value/coefficient of $CSI^i$ and $CSI^j$ on each of the remaining p antennas (i.e., additional correlation values from the remaining antennas, where the wireless AP 110 may report one CSI sample on each antenna at each time). Thus, Equation (2) may be used to determine p correlation values from CSI samples at time i and time j. These p correlation values may be averaged. Assuming a mobile device 108 associated with a wireless AP 110 is moving, given a time lag of t ms between times i and j, the wireless AP 110 may report the CSI information at time i and j, respectively. Equation (2) may be used to determine p CSI correlation values on p antennas, based on which an average CSI correlation value (i.e., the correlation value 124) may be determined.

With respect to the CSI correlation value 124, since CSI correlation captures the rate of change of the wireless channel 106, movement of the mobile device 108 relative to the wireless AP 110 may be determined based on the correlation value 124. For example, if the mobile device 108 is static, the correlation value 124 may be expected to be relatively high, and if the mobile device 108 is moving, the correlation value 124 may be expected to be relatively low.

Figure 2:
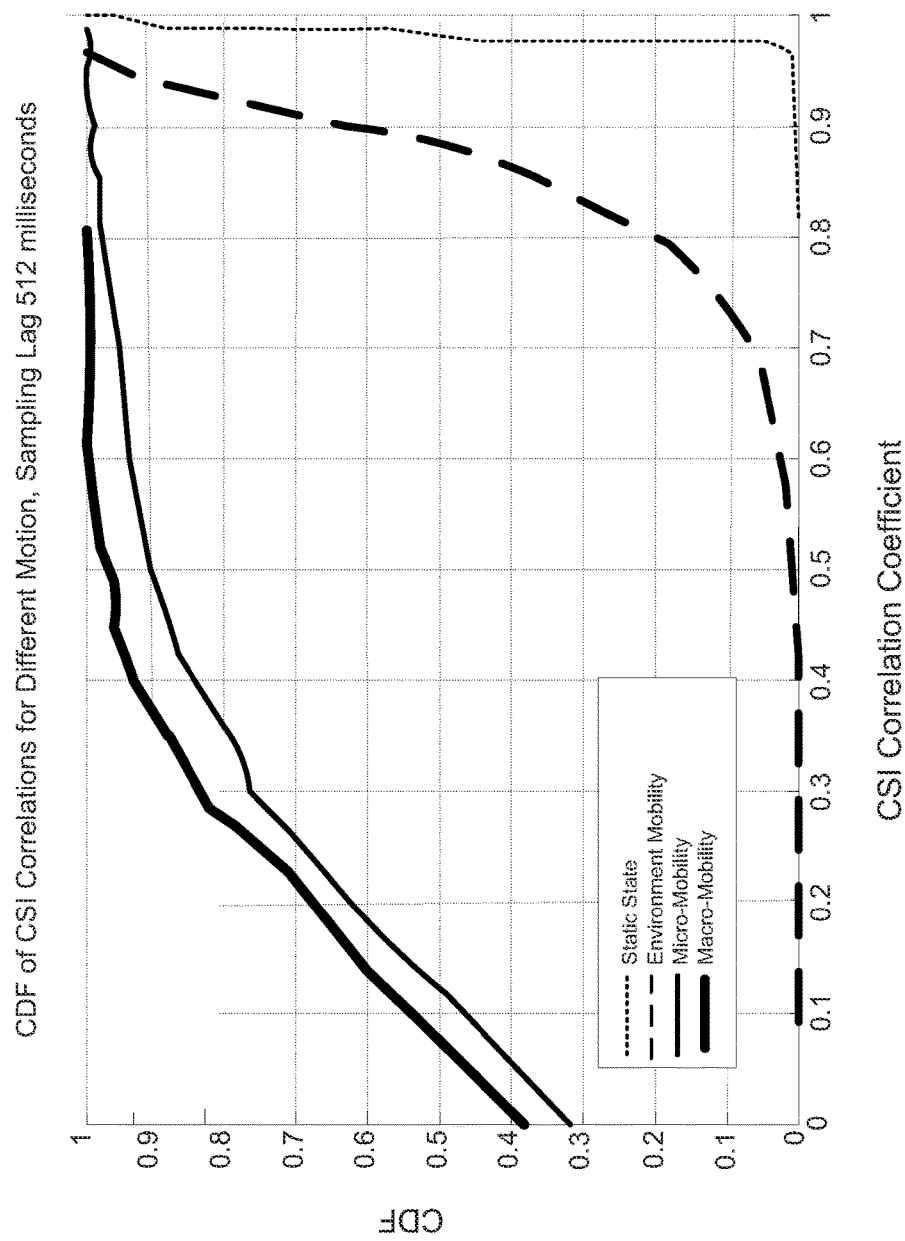
FIG. 2 illustrates a graph of channel state information (CSI) correlation of two continuous samples for a static state, environmental mobility, micro-mobility, and macro-mobility, according to an example of the present disclosure.

FIG. 2 illustrates a graph of CSI correlation of two continuous samples for a static state, environmental mobility, micro-mobility, and macro-mobility, according to an example of the present disclosure. Referring to FIG. 2, the cumulative distribution functions (CDFs) of CSI correlation values 124 with sampling lag of 512 milliseconds for the static state 132, environmental mobility 134, micro-mobility 136, and macro-mobility 138 are illustrated. As shown in FIG. 2, the correlation values 124 reduce with increased mobility of the mobile device 108 relative to the wireless AP 110. In order to determine whether the mobile device 108 is in the static state 132, under environmental mobility 134, under micro-mobility 136, or under macro-mobility 138, if the correlation value 124 is determined to be more than the static threshold 126 (i.e., $\text{thresh}_{static}$), the movement designation module 130 may determine that the mobile device 108 is static relative to the wireless AP 110. If the correlation value 124 is less than the static threshold 126 (i.e., $\text{thresh}_{static}$) but greater than the environmental threshold 128 (i.e., $\text{thresh}_{environment}$), then the movement designation module 130 may determine that the mobile device 108 is under the environmental mobility 134. Further, if the correlation value 124 is less than the environmental threshold 128 (i.e., $\text{thresh}_{environment}$), then the movement designation module 130 may determine that the mobile device 108 is either under the micro-mobility 136 (i.e., in a micro-mobility mode) or under the macro-mobility 138 (i.e., in a macro-mobility mode). According to an example, the CSI vectors 116 between the wireless AP 110 and the mobile device 108 may be determined every 512 ms, and the correlation value 124 may be determined whenever a new CSI vector is received. According to an example, with respect to FIG. 2, the static threshold 126 is approximately 0.95±0.05, and the environmental threshold 128 is approximately 0.70±0.05.

With respect to discrimination between the micro-mobility 136 and the macro-mobility 138 based on the correlation values, referring to FIG. 2, a particular correlation value may indicate either micro-mobility 136 or macro-mobility 138 based on the environment and link quality of the wireless channel 106. In this regard, the ToF determination module 140 may determine the ToF 142 for a signal traversal between the mobile device 108 and the wireless AP 110 to distinguish between the micro-mobility 136 and the macro-mobility 138. The ToF 142 may capture the propagation delay for a signal traversing between a transmitter at the mobile device 108 or the wireless AP 110, and a receiver at the other one of the wireless AP 110 and the mobile device 108. Since propagation delay is proportional to the distance between the mobile device 108 and the wireless AP 110, any change in ToF values indicate the change in distance between the mobile device 108 and the wireless AP 110. Thus, the ToF is proportional to the distance between a transmitter (e.g., at the mobile device 108 or the wireless AP 110) and a receiver (e.g., at the other one of the wireless AP 110 and the mobile device 108). The speed of movement determination module 144 may determine the speed of movement of the mobile device 108 from the change in ToF. According to an example, the ToF may be determined from a wireless driver of the wireless AP 110. In order to determine the ToF between the mobile device 108 and the wireless AP 110, the wireless AP 110 may send a NULL data frame to the mobile device 108. For example, the wireless AP 110 may send a data frame that includes an 802.11 frame control field, type 10, and subtype 0100. The mobile device 108, even if it is not associated with the wireless AP 110, may reply with an acknowledgement (ACK), for example, as specified in the IEEE 802.11 standard. The speed of movement determination module 144 may determine the speed of movement of the mobile device 108 by dividing the difference between the ToF at times $t_2$ and $t_1$ (e.g., (ToF$_2$–ToF$_1$)) by the difference between the times $t_2$ and $t_1$ (e.g., ($t_2$–$t_1$), where $t_2$>$t_1$) as follows:

$$\text{Speed of Movement} = (\text{ToF}_2 - \text{ToF}_1)/(t_2 - t_1) \quad \text{Equation (3)}$$

Figure 3:
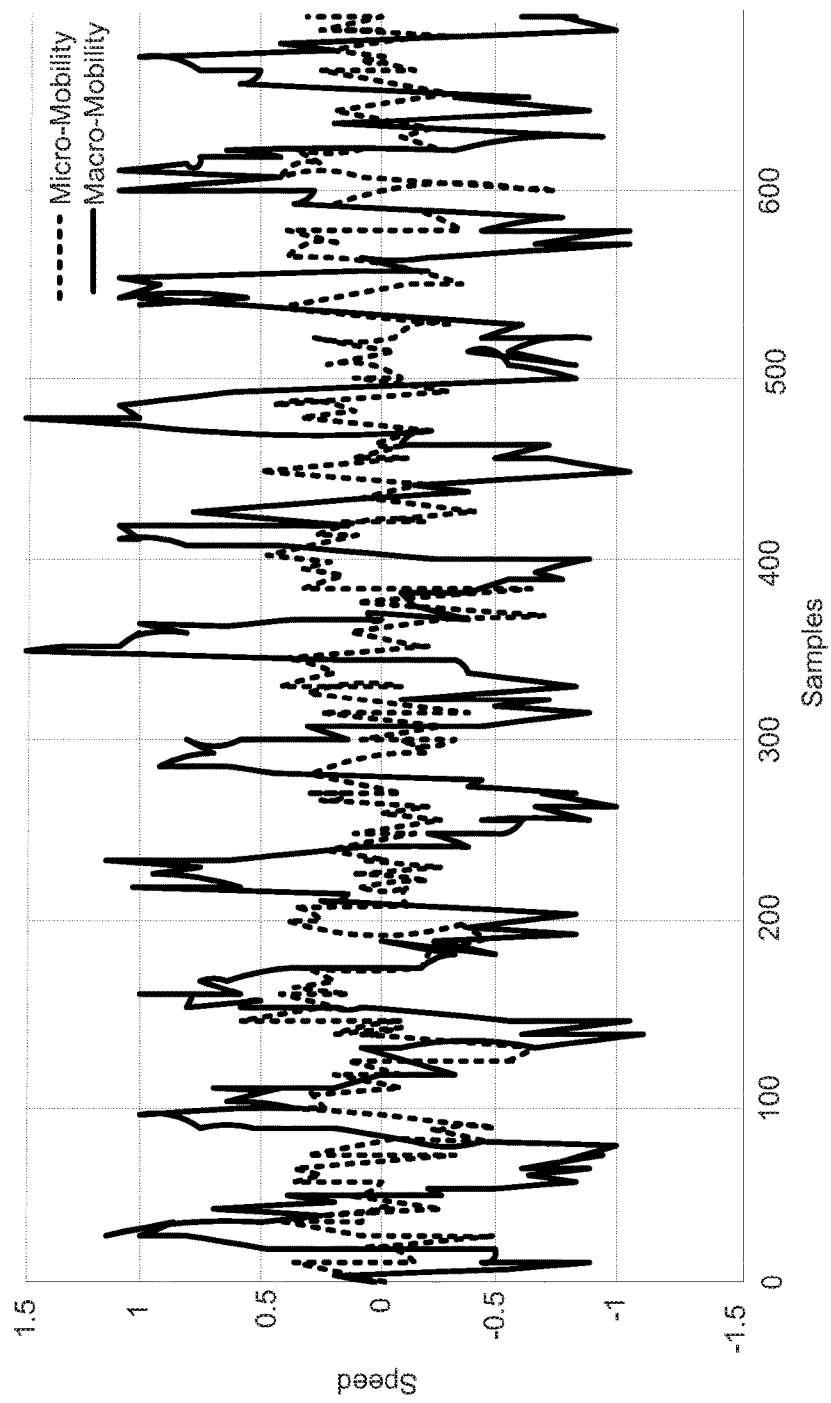
FIG. 3 illustrates a graph of speed estimations for a mobile device in micro-mobility, and macro-mobility, according to an example of the present disclosure.

FIG. 3 illustrates a graph of speed estimations for a mobile device in micro-mobility, and macro-mobility, according to an example of the present disclosure. Based on the assumption that the speed of the mobile device 108 under the micro-mobility 136 will be less than that in the speed under the macro-mobility 138 (e.g., see FIG. 3), if the speed of movement of the mobile device 108 is greater than the ToF threshold 150, the speed of movement comparison module 148 may determine that the mobile device 108 is under the macro-mobility 138. Otherwise, if the moving speed of the mobile device 108 is low (i.e., less than the ToF threshold 150), the speed of movement comparison module 148 may determine that the mobile device 108 is under the micro-mobility 136. For the example of FIG. 3, the ToF threshold 150 may be approximately 0.35±0.05.

The wireless protocol selection module 152 may select an appropriate wireless protocol for the wireless channel 106 based on whether the mobile device 108 is in the static state 132 relative to the wireless AP 110, whether there is environmental mobility 134 between the mobile device 108 and the wireless AP 110, or whether there is micro-mobility 136 or macro-mobility 138 between the mobile device 108 and the wireless AP 110. For example, in the static state 132, the wireless channel 105 is expected to remain stable, and hence, the wireless protocol selection module 152 may utilize past transmission history to select an appropriate wireless protocol. During movement of the mobile device 108, the wireless protocol selection module 152 may limit the length of past history that a wireless protocol may refer to based on the intensity of movement of the mobile device 108 (and/or the wireless AP 110). For example, if the mobile device 108 is under macro-mobility 138 and is moving towards the wireless AP 110 (e.g., based on increase or decrease in the ToF 142), quality of the wireless channel 106 is likely to improve, and hence a more aggressive transmission bit-rate control (e.g., a transmission bit-rate control that provides for transmission of a higher number of bits for a given time duration) may be employed. If the mobile device 108 is under macro-mobility 138 and is moving away from the wireless AP 110, a more conservative bit-rate control (e.g., a transmission bit-rate control that provides for transmission of a lower number of bits for a given time duration) may be employed.

Under the macro-mobility 138, the wireless protocol selection module 152 may also roam the mobile device 108 to a wireless AP 110 with higher wireless channel quality. If the mobile device 108 is in the static state 132 relative to the wireless AP 110, the wireless protocol selection module 152 may prevent consideration of roaming since this is unlikely to result in discovery of a wireless AP 110 with a higher wireless channel quality. Further, mechanisms to obtain higher throughput, for example, in 802.11n/ac WLANs, such as frame aggregation, beam-forming, and multi-user MIMO (MU-MIMO), typically utilize different optimizations based on the intensity of mobility of the mobile device 108. In this regard, the wireless protocol selection module 152 may similarly select an appropriate wireless protocol for the wireless channel 106 based on whether the mobile device 108 is in the static state 132 relative to the wireless AP 110, under environmental mobility 134, under micro-mobility 136, or under macro-mobility 138 relative to the wireless AP 110. Further, the selection of the appropriate wireless protocol during movement of the mobile device 108 relative to the wireless AP 110 may be specified in order of (e.g., from aggressive to conservative in order of transmission of a number of bits for a given time duration) the static state 132, the environmental mobility 134, the micro-mobility 136, and followed by the macro-mobility 138.

Figure 4:
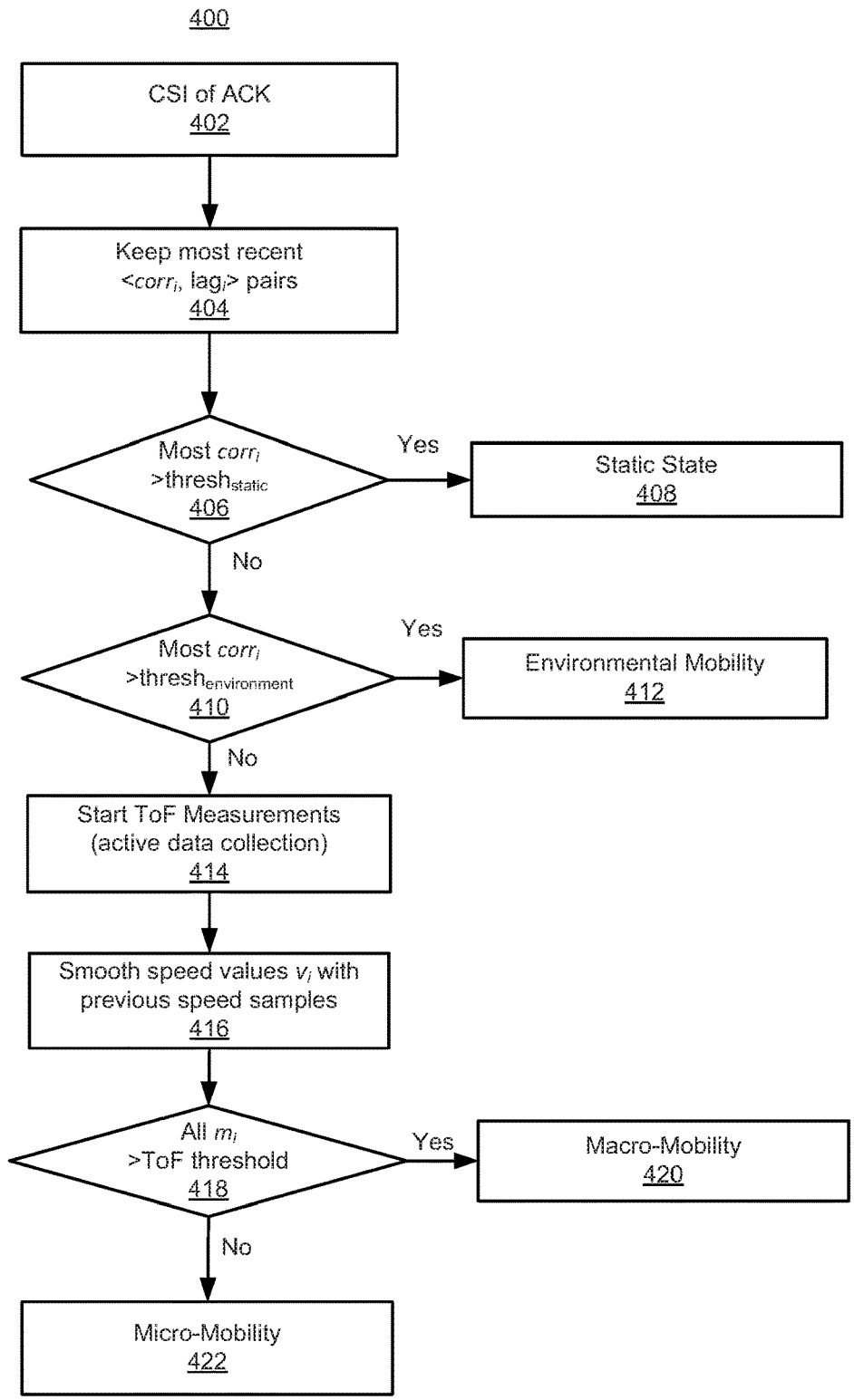
FIG. 4 illustrates a flowchart mobility determination, according to an example of the present disclosure.

FIG. 4 illustrates a flowchart 400 of mobility determination, according to an example of the present disclosure.

Referring to FIG. 4, at block 402, the CSI 104 may be determined upon receipt of an acknowledgement (ACK) packet from the mobile device 108.

At block 404, for the given CSI 104, the correlation (Corr (i, j)) between two CSI vectors $CSI^i$ and $CSI^j$ may be determined. $CSI^j$ may represent the CSI vector for the time lag value $lag_i$, and $corr_i$ may represent the correlation (Corr (i, j)).

At block 406, if the correlation value 124 is determined to be more than the static threshold 126 (i.e., $thresh_{static}$), at block 408, the movement designation module 130 may determine that the mobile device 108 is static relative to the wireless AP 110.

At block 410, if the correlation value 124 is determined to be greater than the environmental threshold 128 (i.e., $thresh_{environment}$), at block 412, the movement designation module 130 may determine that the mobile device 108 is under the environmental mobility 134.

At block 414, the ToF determination module 140 may determine the ToF 142 for a signal traversal between the mobile device 108 and the wireless AP 110 to distinguish between the micro-mobility 136 and the macro-mobility 138.

At block 416, the speed values (i.e., speed of movement 146) may be smoothed (e.g., by removing noise) with previous speed samples.

At block 418, the magnitude of the speed values $m_i$ may be compared with the ToF threshold 150. For example, if the speed of movement of the mobile device 108 is greater than the ToF threshold 150, at block 420, the speed of movement comparison module 148 may determine that the mobile device 108 is under the macro-mobility 138.

At block 422, since the moving speed of the mobile device 108 is low (i.e., less than the ToF threshold 150), the speed of movement comparison module 148 may determine that the mobile device 108 is under the micro-mobility 136.

Figure 5:
FIG. 5 illustrates a method for mobility determination, according to an example of the present disclosure.
Figure 6:
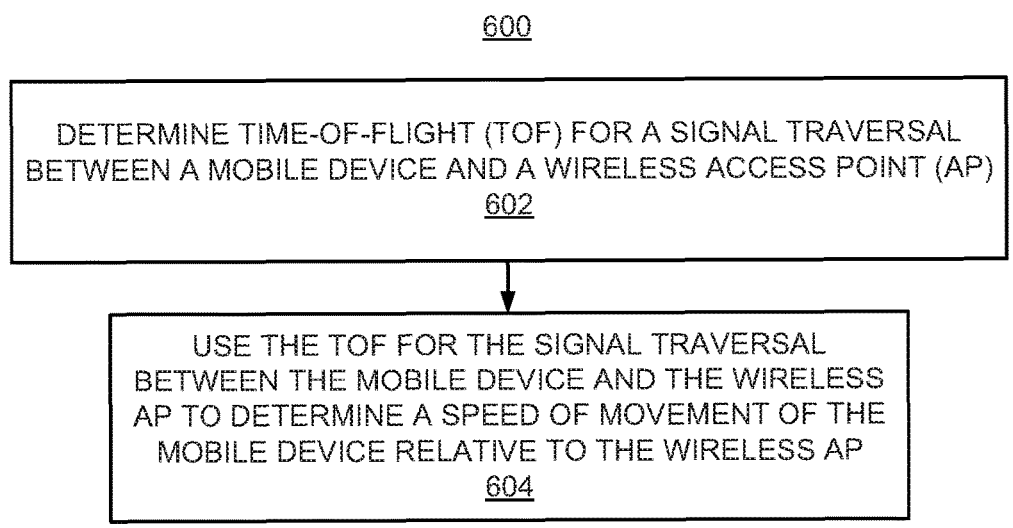
FIG. 6 illustrates further details of the method for mobility determination, according to an example of the present disclosure.

FIGS. 5 and 6 respectively illustrate flowcharts of methods 500 and 600 for mobility determination, corresponding to the example of the mobility determination apparatus 100 whose construction is described in detail above. The methods 500 and 600 may be implemented on the mobility determination apparatus 100 with reference to FIGS. 1-4 by way of example and not limitation. The methods 500 and 600 may be practiced in other apparatus.

Referring to FIG. 5, for the method 500, at block 502, the method may include determining CSI for a wireless channel between a mobile device and a wireless AP. For example, referring to FIG. 1, the CSI determination module 102 may determine the CSI 104 for the wireless channel 106 between the mobile device 108 and the wireless AP 110.

At block 504, the method may include using the CSI to determine movement between the mobile device and the wireless AP. For example, referring to FIG. 1, the movement determination module 112 may use the CSI 104 to determine movement between the mobile device 108 and the wireless AP 110.

According to an example, for the method 500, using the CSI to determine movement between the mobile device and the wireless AP may further include determining a plurality of CSI vectors that represent the CSI at different times, and determining correlation within at least one pair of the plurality of CSI vectors to determine the movement between the mobile device and the wireless AP. For example, referring to FIG. 1, the CSI vector determination module 114 may determine the plurality of CSI vectors 116 that represent the CSI 104 at different times. Further, the correlation determination module 118 may determine the correlation 120 within a pair of the plurality of CSI vectors 116 to determine the movement between the mobile device 108 and the wireless AP 110.

According to an example, for the method 500, determining correlation within at least one pair of the plurality of CSI vectors to determine the movement between the mobile device and the wireless AP may further include comparing a correlation value that is determined by the correlation to a static threshold and to an environmental threshold. For example, referring to FIG. 1, a correlation value comparison module 122 may compare the correlation value 124 that is determined by the correlation 120 to the static threshold 126 and to the environmental threshold 128. In response to a determination that the correlation value is greater than the static threshold, the method 500 may include designating the mobile device as being static relative to the wireless AP. For example, referring to FIG. 1, in response to a determination that the correlation value 124 is greater than the static threshold 126, the movement designation module 130 may designate the mobile device 108 as being in the static state 132 relative to the wireless AP 110. In response to a determination that the correlation value is less than the static threshold and greater than the environmental threshold, the method 500 may include designating the mobile device as being under environmental mobility relative to the wireless AP. For example, referring to FIG. 1, in response to a determination that the correlation value 124 is less than the static threshold 126 and greater than the environmental threshold 128, the movement designation module 130 may designate the mobile device 108 as being under environmental mobility 134 relative to the wireless AP 110. Further, in response to a determination that the correlation value is less than the environmental threshold, the method 500 may include designating the mobile device as being under micro-mobility or macro-mobility relative to the wireless AP. For example, referring to FIG. 1, in response to a determination that the correlation value 124 is less than the environmental threshold 128, the movement designation module 130 may designate the mobile device 108 as being under micro-mobility 136 or macro-mobility 138 relative to the wireless AP 110.

According to an example, for the method 500, using the CSI to determine movement between the mobile device and the wireless AP may further include determining whether the mobile device is static relative to the wireless AP, in response to a determination that the mobile device is not static relative to the wireless AP, determining environmental mobility between the mobile device and the wireless AP, and in response to a determination that the mobile device is not under the environmental mobility relative to the wireless AP, determining micro-mobility and macro-mobility between the mobile device and the wireless AP.

According to an example, the method 500 may further include using ToF for a signal traversal between the mobile device and the wireless AP to distinguish between the micro-mobility and the macro-mobility. For example, referring to FIG. 1, the speed of movement determination module 144 may use the ToF 142 for the signal traversal between the mobile device 108 and the wireless AP 110 to distinguish between the micro-mobility 136 and the macro-mobility 138.

According to an example, the method 500 may further include using ToF for a signal traversal between the mobile device and the wireless AP to determine a speed of the movement of the mobile device relative to the wireless AP. For example, referring to FIG. 1, the speed of movement determination module 144 may use the ToF 142 for the signal traversal between the mobile device 108 and the wireless AP 110 to determine the speed of movement 146 of the mobile device 108 relative to the wireless AP 110.

According to an example, for the method 500, using ToF for a signal traversal between the mobile device and the wireless AP to determine a speed of the movement of the mobile device relative to the wireless AP may further include comparing the speed of the movement of the mobile device relative to the wireless AP to a ToF threshold. For example, referring to FIG. 1, the speed of movement comparison module 148 may compare the speed of movement 146 of the mobile device 108 relative to the wireless AP 110 to the ToF threshold 150. In response to a determination that the speed of the movement of the mobile device relative to the wireless AP is less than the ToF threshold, the method 500 may include designating the movement between the mobile device and the wireless AP as micro-mobility. For example, referring to FIG. 1, in response to a determination that the speed of movement 146 of the mobile device 108 relative to the wireless AP 110 is less than the ToF threshold 150, the movement designation module 130 may designate the movement between the mobile device 108 and the wireless AP 110 as the micro-mobility 136. In response to a determination that the speed of the movement of the mobile device relative to the wireless AP is greater than the ToF threshold, the method 500 may include designating the movement between the mobile device and the wireless AP as macro-mobility. For example, referring to FIG. 1, in response to a determination that the speed of movement 146 of the mobile device 108 relative to the wireless AP 110 is greater than the ToF threshold 150, the movement designation module 130 may designate the movement between the mobile device 108 and the wireless AP 110 as the macro-mobility 138.

According to an example, the method 500 may further include determining the CSI as a function of a number of subcarriers and antennas supported by the wireless AP.

According to an example, the method 500 may further include determining a wireless protocol for transmission of data between the mobile device and the wireless AP based on the determined movement between the mobile device and the wireless AP, and the determined speed of the movement of the mobile device relative to the wireless AP. For example, referring to FIG. 1, the wireless protocol selection module 152 may select an appropriate wireless protocol for the wireless channel 106 based on whether the mobile device 108 is in the static state 132 relative to the wireless AP 110, whether there is environmental mobility 134 between the mobile device 108 and the wireless AP 110, or whether there is micro-mobility 136 or macro-mobility 138 between the mobile device 108 and the wireless AP 110.

Referring to FIG. 6, for the method 600, at block 602, the method may include determining ToF for a signal traversal between a mobile device and a wireless AP. For example, referring to FIG. 1, the ToF determination module 140 may determine the ToF 142 for a signal traversal between the mobile device 108 and the wireless AP 110.

At block 604, the method may include using the ToF for the signal traversal between the mobile device and the wireless AP to determine a speed of movement of the mobile device relative to the wireless AP. For example, referring to FIG. 1, the speed of movement determination module 144 may use the ToF 142 for the signal traversal between the mobile device 108 and the wireless AP 110 to determine the speed of movement 146 of the mobile device 108 relative to the wireless AP 110.

Figure 7:
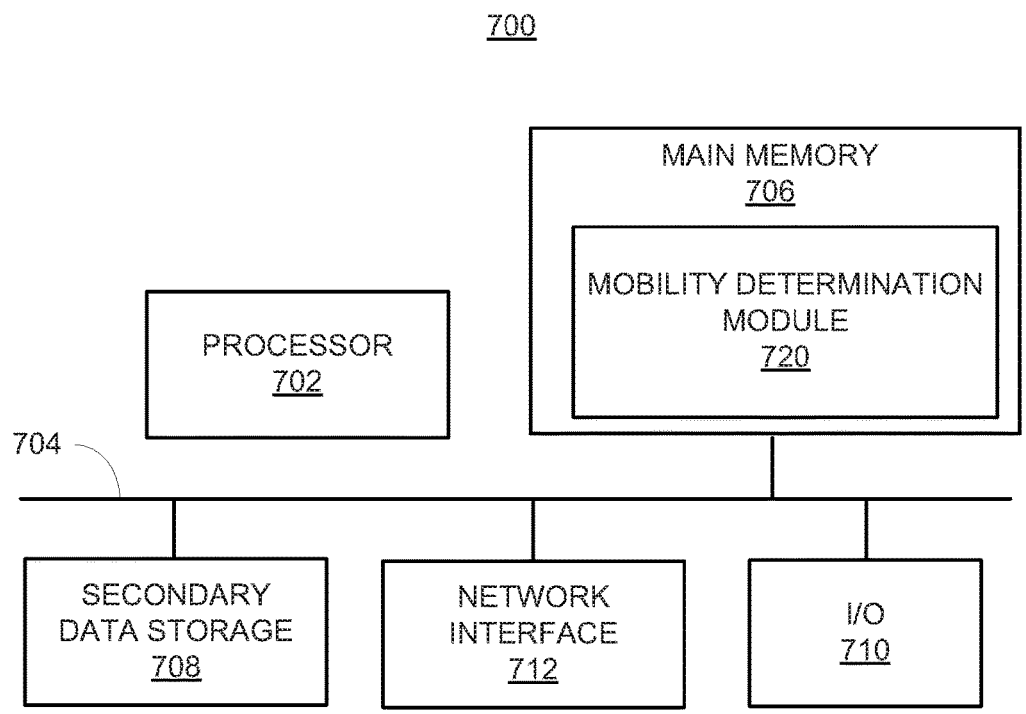
FIG. 7 illustrates a computer system, according to an example of the present disclosure.

FIG. 7 shows a computer system 700 that may be used with the examples described herein. The computer system 700 may represent a generic platform that includes components that may be in a server or another computer system. The computer system 700 may be used as a platform for the apparatus 100. The computer system 700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 700 may include a processor 702 that may implement or execute machine readable instructions performing some or all of the methods, functions and other processes described herein. Commands and data from the processor 702 may be communicated over a communication bus 704. The computer system may also include a main memory 706, such as a random access memory (RAM), where the machine readable instructions and data for the processor 702 may reside during runtime, and a secondary data storage 708, which may be non-volatile and stores machine readable instructions and data. The memory and data storage are examples of computer readable mediums. The main memory 706 may include a mobility determination module 720 including machine readable instructions residing in the main memory 706 during runtime and executed by the processor 702. The mobility determination module 720 may include the modules of the apparatus 100 shown in FIG. 1.

The computer system 700 may include an I/O device 710, such as a keyboard, a mouse, a display, etc. The computer system may include a network interface 712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for mobility determination, the method comprising:
   determining channel state information (CSI) for a wireless channel between a mobile device and a wireless access point (AP);
   using the CSI to determine, by a processor, movement between the mobile device and the wireless AP;
   determining a plurality of CSI vectors that represent the CSI at different times;
   determining correlation within at least one pair of the plurality of CSI vectors to determine the movement between the mobile device and the wireless AP;
   comparing a correlation value that is determined by the correlation to a static threshold and to an environmental threshold;
   in response to a determination that the correlation value is greater than the static threshold, designating the mobile device as being static relative to the wireless AP; and
   in response to a determination that the correlation value is less than the static threshold and greater than the environmental threshold, designating the mobile device as being under environmental mobility relative to the wireless AP, wherein the environmental mobility comprises at least one of object and person movement that is external to at least one of the mobile device and the wireless AP that affects the wireless channel between the mobile device and the wireless AP.

2. The method of claim 1, wherein determining correlation within at least one pair of the plurality of CSI vectors to determine the movement between the mobile device and the wireless AP further comprises:
   in response to a determination that the correlation value is less than the environmental threshold, designating the mobile device as being under micro-mobility or macro-mobility relative to the wireless AP, wherein the micro-mobility comprises a smaller amount of movement or constrained movement between the mobile device and the wireless AP compared to the macro-mobility, and wherein the micro-mobility and the macro-mobility comprise movement of at least one of the mobile device and the wireless AP that affects the wireless channel between the mobile device and the wireless AP.

3. The method of claim 1, wherein the static threshold is approximately 0.95±0.05, and the environmental threshold is approximately 0.70±0.05.

4. The method of claim 1, further comprising:
   using time-of-flight (ToF) for a signal traversal between the mobile device and the wireless AP to determine a speed of the movement of the mobile device relative to the wireless AP.

5. The method of claim 4, wherein using ToF for a signal traversal between the mobile device and the wireless AP to determine a speed of the movement of the mobile device relative to the wireless AP further comprises:
  comparing the speed of the movement of the mobile device relative to the wireless AP to a ToF threshold;
  in response to a determination that the speed of the movement of the mobile device relative to the wireless AP is less than the ToF threshold, designating the movement between the mobile device and the wireless AP as micro-mobility; and
  in response to a determination that the speed of the movement of the mobile device relative to the wireless AP is greater than the ToF threshold, designating the movement between the mobile device and the wireless AP as macro-mobility,
  wherein the micro-mobility and the macro-mobility comprise movement of at least one of the mobile device and the wireless AP that affects the wireless channel between the mobile device and the wireless AP.

6. The method of claim 1, further comprising:
determining the CSI as a function of a number of subcarriers and antennas supported by the wireless AP.

7. A mobility determination apparatus comprising:
a processor; and
a memory storing machine readable instructions that when executed by the processor cause the processor to:
  use channel state Information (CSI) to determine movement between a mobile device and a wireless access point (AP);
  determine whether the mobile device is static relative to the wireless AP;
  in response to a determination that the mobile device is static relative to the wireless AP, designating the mobile device as being under a static state;
  in response to a determination that the mobile device is not static relative to the wireless AP, determine environmental mobility between the mobile device and the wireless AP, wherein the environmental mobility comprises at least one of object and person movement that is external to at least one of the mobile device and the wireless AP that affects a wireless channel between the mobile device and the wireless AP;
  in response to a determination that the mobile device is not under the environmental mobility relative to the wireless AP, determine movement of at least one of the mobile device and the wireless AP that affects the wireless channel between the mobile device and the wireless AP; and
  in response to a determination that the mobile device is moving relative to the wireless AP, use time-of-flight (ToF) for a signal traversal between the mobile device and the wireless AP to determine a speed of the movement of the mobile device relative to the wireless AP.

8. The mobility determination apparatus according to claim 7, wherein the machine readable instructions to use CSI to determine movement between a mobile device and a wireless AP, further cause the processor to:
  determine a plurality of CSI vectors that represent the CSI at different times; and
  determine correlation within at least one pair of the plurality of CSI vectors to determine the movement between the mobile device and the wireless AP.

9. The mobility determination apparatus according to claim 7, wherein the machine readable instructions further cause the processor to:
  determine a wireless protocol for transmission of data between the mobile device and the wireless AP based on the determined movement between the mobile device and the wireless AP, and the determined speed of the movement of the mobile device relative to the wireless AP.

10. A non-transitory computer readable medium having stored thereon machine readable instructions to provide mobility determination, the machine readable instructions, when executed, cause a processor to:
  determine time-of-flight (ToF) for a signal traversal between a mobile device and a wireless access point (AP);
  use the ToF for the signal traversal between the mobile device and the wireless AP to determine a speed of movement of the mobile device relative to the wireless AP;
  determine whether the mobile device is static relative to the wireless AP;
  in response to a determination that the mobile device is static relative to the wireless AP, designating the mobile device as being under a static state;
  in response to a determination that the mobile device is not static relative to the wireless AP, determine environmental mobility between the mobile device and the wireless AP, wherein the environmental mobility comprises at least one of object and person movement that is external to at least one of the mobile device and the wireless AP that affects a wireless channel between the mobile device and the wireless AP; and
  in response to a determination that the mobile device is not under the environmental mobility relative to the wireless AP, determine movement of at least one of the mobile device and the wireless AP that affects the wireless channel between the mobile device and the wireless AP.

11. The non-transitory computer readable medium of claim 10, wherein the machine readable instructions to use the ToF for the signal traversal between the mobile device and the wireless AP to determine a speed of movement, of the mobile device relative to the wireless AP, further cause the processor to:
  compare the speed of movement of the mobile device relative to the wireless AP to a ToF threshold;
  in response to a determination that the speed of movement of the mobile device relative to the wireless AP is less than the ToF threshold, designate the movement between the mobile device and the wireless AP as micro-mobility; and
  in response to a determination that the speed of movement of the mobile device relative to the wireless AP is greater than the ToF threshold, designate the movement between the mobile device and the wireless AP as macro-mobility,
  wherein the micro-mobility and the macro-mobility comprise movement of at least one of the mobile device and the wireless AP that affects a wireless channel between the mobile device and the wireless AP.

12. A method for mobility determination, the method comprising:
  determining channel state information (CSI) for a wireless channel between a mobile device and a wireless access point (AP);
  using the CSI to determine, by a processor, movement between the mobile device and the wireless AP;
  determining whether the mobile device is static relative to the wireless AP;

in response to a determination that the mobile device is static relative to the wireless AP, designating the mobile device as being under a static state;

in response to a determination that the mobile device is not static relative to the wireless AP, determining environmental mobility between the mobile device and the wireless AP, wherein the environmental mobility comprises at least one of object and person movement that is external to at least one of the mobile device and the wireless AP that affects the wireless channel between the mobile device and the wireless AP; and in response to a determination that the mobile device is not under the environmental mobility relative to the wireless AP, determining micro-mobility and macro-mobility between the mobile device and the wireless AP, wherein the micro-mobility comprises a smaller amount of movement or constrained movement between the mobile device and the wireless AP compared to the macro-mobility, and wherein the micro-mobility and the macro-mobility comprise movement of at least one of the mobile device and the wireless AP that affects the wireless channel between the mobile device and the wireless AP.

13. The method of claim 12, further comprising:

using time-of-flight (ToF) for a signal traversal between the mobile device and the wireless AP to distinguish between the micro-mobility and the macro-mobility.

* * * * *